United States Patent
Bowers

(10) Patent No.: US 6,247,752 B1
(45) Date of Patent: Jun. 19, 2001

(54) CRASH-RESPONSIVE BLOCKING DEVICE FOR A VEHICLE SEAT FRAME

(75) Inventor: Paul A. Bowers, Ray, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/163,751

(22) Filed: Sep. 30, 1998

(51) Int. Cl.$^7$ .................................................. B60N 2/47
(52) U.S. Cl. ................. 297/216.1; 296/68.1; 297/216.14
(58) Field of Search ...................... 297/216.13, 216.14, 297/363, 364, 216.1; 296/68.1

(56) References Cited

U.S. PATENT DOCUMENTS

| | | | |
|---|---|---|---|
| 3,420,572 | * | 1/1969 | Bisland ........................ 297/216.13 X |
| 3,877,748 | | 4/1975 | Eggert . |
| 4,165,128 | | 8/1979 | Strowick et al. . |
| 5,366,268 | | 11/1994 | Miler et al. . |
| 5,507,553 | | 4/1996 | Nishizawa et al. . |
| 5,641,198 | | 6/1997 | Steffens, Jr. . |
| 5,676,421 | * | 10/1997 | Brodsky ........................... 297/216.13 |
| 5,681,081 | | 10/1997 | Linder et al. . |
| 5,722,719 | | 3/1998 | Glomstad . |
| 5,730,411 | | 3/1998 | Pawlowicz et al. . |
| 5,836,648 | * | 11/1998 | Karschin et al. ........... 297/216.13 X |
| 5,902,010 | * | 5/1999 | Cuevas ............................. 297/216.13 |
| 5,927,804 | * | 7/1999 | Cuevas ....................... 297/216.13 X |
| 6,053,571 | * | 4/2000 | Faigle ........................... 297/216.14 X |

* cited by examiner

Primary Examiner—Peter M. Cuomo
Assistant Examiner—Stephen Vu
(74) Attorney, Agent, or Firm—Tarolli, Sundheim, Covell, Tummino & Szabo L.L.P.

(57) ABSTRACT

An apparatus (10) includes structure (96, 98) for sensing and responding to vehicle acceleration by providing an electrical actuation signal. The apparatus further includes a blocking device (36) which is responsive to the electrical actuation signal to block at least a portion of a vehicle seat frame (18) from moving under the influence of vehicle crash forces upon the occurrence of the crash-indicating acceleration. The sensing and responding structure (96, 98) is operative so as not to provide the electrical actuation signal if the crash-indicating acceleration is below or within a specified range of intermediate levels that indicate crashes having corresponding intermediate levels of severity. The sensing and responding structure (96, 98) is further operative to provide the electrical actuation signal if the crash-indicating acceleration has a relatively high level above the specified range of intermediate levels.

11 Claims, 2 Drawing Sheets

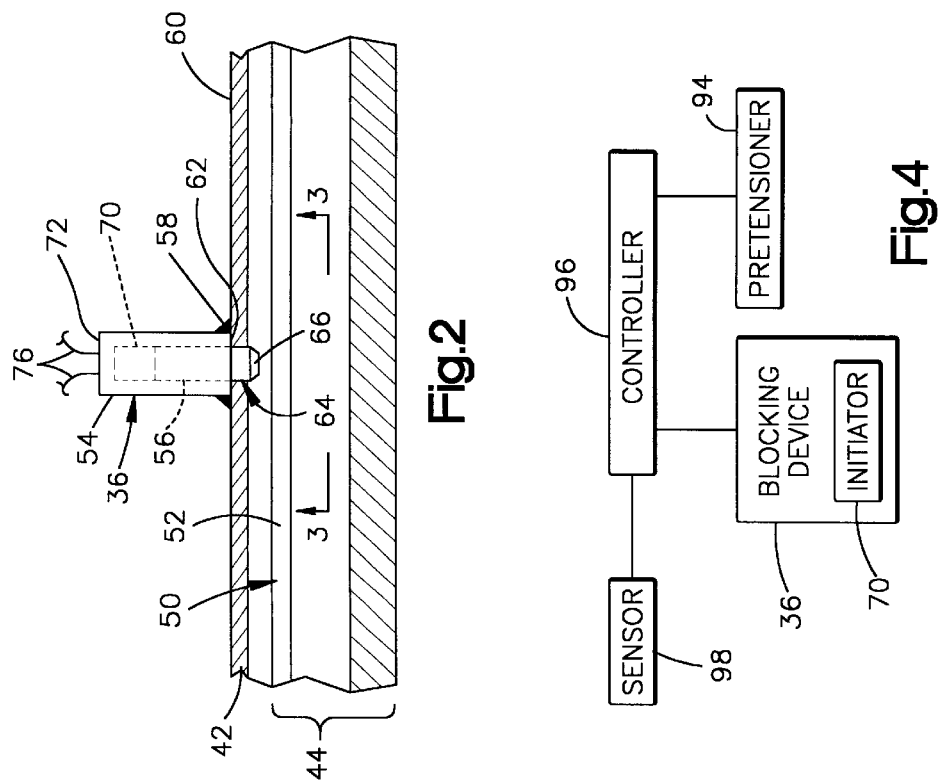
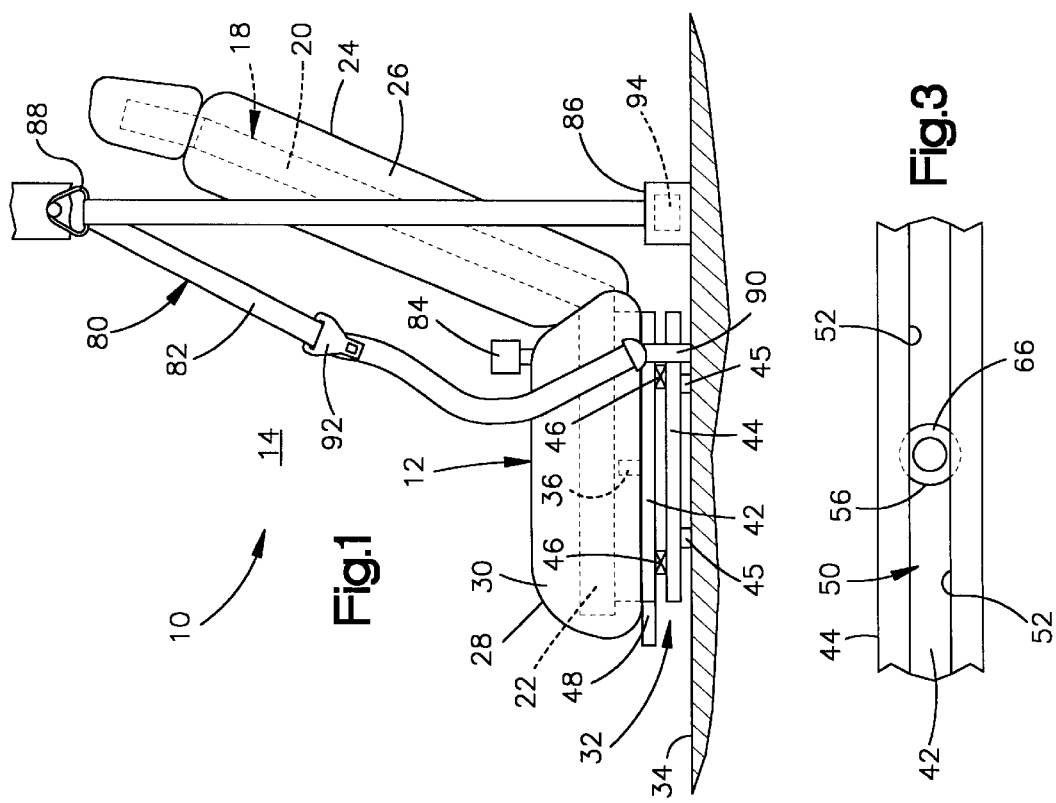

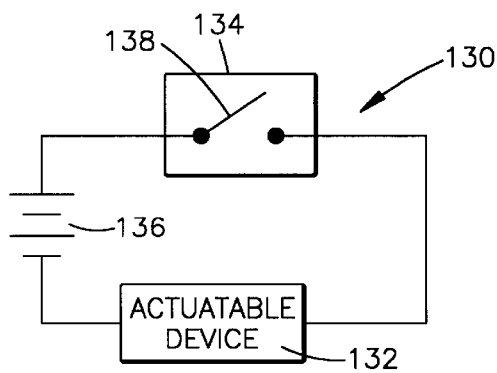
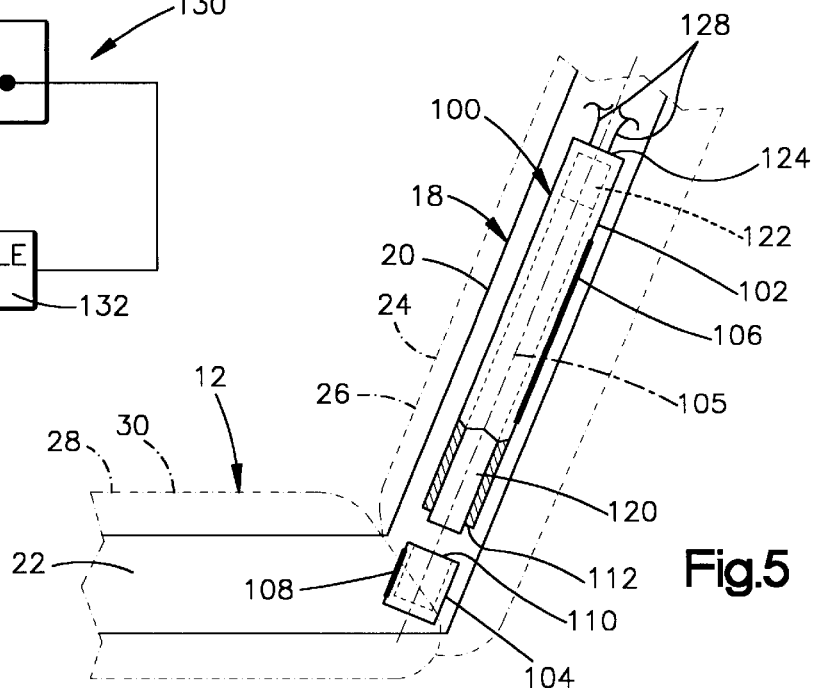
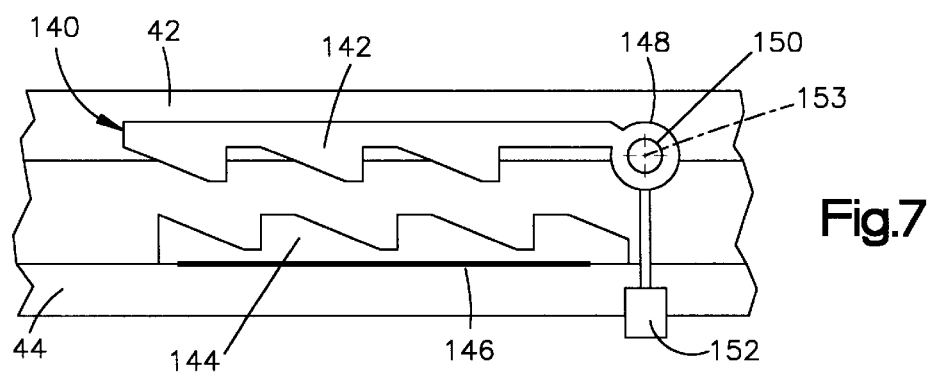
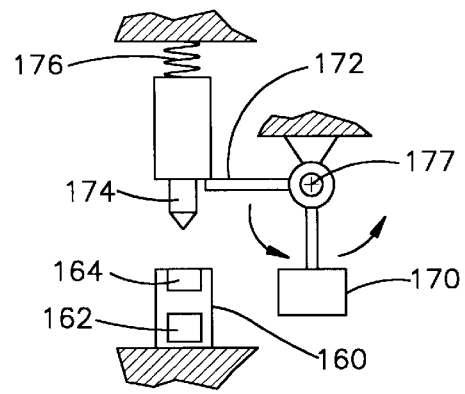

CRASH-RESPONSIVE BLOCKING DEVICE FOR A VEHICLE SEAT FRAME

FIELD OF THE INVENTION

The present invention relates to an apparatus for helping to protect an occupant of a vehicle seat upon the occurrence of a vehicle crash.

BACKGROUND OF THE INVENTION

A seat in a vehicle includes a seat back and a seat bottom. When the vehicle experiences a crash, crash forces tend to move an occupant of the seat relative to the seat. For example, the vehicle may experience a crash in which an impact is directed against the rear end of the vehicle. Crash forces then act against the vehicle in a forward direction. Such crash forces may cause the occupant to move relative to the seat in a rearward direction, and thereby to move forcefully against the seat back.

SUMMARY OF THE INVENTION

In accordance with a principal feature of the present invention, an apparatus includes means for sensing and responding to crash-indicating vehicle acceleration by providing an electrical actuation signal. The apparatus further includes a blocking device. The blocking device is responsive to the electrical actuation signal to block at least a portion of a vehicle seat frame from moving under the influence of vehicle crash forces upon the occurrence of the crash-indicating acceleration.

The sensing and responding means is operative so as not to provide the electrical actuation signal if the crash-indicating acceleration is below or within a specified range of intermediate levels. Each intermediate level of crash-indicating acceleration indicates a crash having a corresponding intermediate level of severity. However, the sensing and responding means is operative to provide the electrical actuation signal if the crash-indicating acceleration has a relatively high level above the specified range of intermediate levels.

In accordance with another principal feature of the present invention, an apparatus includes an inertia weight which is movable toward an actuating position under the influence of crash-indicating vehicle acceleration. The inertia weight is movable only partially to the actuating position under the influence of crash-indicating acceleration below or within the specified range of intermediate levels. The inertia weight is further movable fully to the actuating position under the influence of a high level of crash-indicating acceleration above the specified range of intermediate levels.

A blocking device is responsive to movement of the inertia weight fully to the actuating position so as to block at least a portion of a vehicle seat frame from moving under the influence of vehicle crash forces upon the occurrence of the high level of crash-indicating acceleration. The blocking device comprises a locking member and a charge of pyrotechnic material which, when ignited, develops a thrust which propels the locking member to a position in which the blocking device can block the portion of the seat frame from moving under the influence of the vehicle crash forces.

BRIEF DESCRIPTION OF THE DRAWINGS

The foregoing and other features of the present invention will become apparent to one skilled in the art to which the present invention relates upon reading the following description of the invention with reference to the accompanying drawings, wherein:

FIG. 1 is a side view of parts of an apparatus comprising a first embodiment of the invention, with certain parts being shown schematically;

FIG. 2 is an enlarged partial view of parts shown in FIG. 1;

FIG. 3 is a view taken on line 3—3 of FIG. 2;

FIG. 4 is a block diagram of parts of the first embodiment;

FIG. 5 is a side view of parts of an apparatus comprising a second embodiment of the invention;

FIG. 6 is a schematic view of an electrical circuit including parts of a third embodiment of the invention;

FIG. 7 is a view similar to FIG. 3 showing parts of a fourth embodiment of the invention;

FIG. 8 is a schematic view of parts of an apparatus comprising a fifth embodiment of the invention.

DESCRIPTION OF PREFERRED EMBODIMENTS

An apparatus 10 comprising a first embodiment of the present invention is shown partially in FIG. 1. The apparatus 10 includes a vehicle seat 12 in a vehicle occupant compartment 14. The seat 12 has a frame 18 with an upper section 20 and a lower section 22. A back portion 24 of the seat 12 is defined in part by the upper section 20 of the frame 18 and in part by a back cushion 26 which covers the upper section 20 of the frame 18. A bottom portion 28 of the seat 12 is similarly defined in part by the lower section 22 of the frame 18 and in part by a bottom cushion 30 which covers the lower section 22 of the frame 18.

A track structure 32 beneath the seat 12 supports the lower section 22 of the frame 18, and hence the entire seat 12, for fore and aft movement relative to the vehicle floor 34. When the vehicle experiences a crash, crash forces may cause an occupant of the seat 12 to move against the seat back 24. In accordance with the present invention, the seat 12 is equipped with a blocking device 36 (shown schematically) which is actuatable to block movement of the seat 12 on the track structure 32 under the influence of such vehicle crash forces.

The track structure 32 includes a pair of upper tracks 42 and a pair of lower tracks 44, with one of each being shown in the side view of FIG. 1. The lower tracks 44 are fixed to the vehicle floor 34 by mounting legs 45. A plurality of roller bearings 46 support the upper tracks 42 on the lower tracks 44 for movement longitudinally relative to the lower tracks 44. The lower section 22 of the seat frame 18 is fixed to the upper tracks 42 so that the seat 12 is movable in the fore and aft directions upon longitudinal movement of the upper tracks 42 relative to the lower tracks 44. A positioning apparatus 48 (shown schematically), such as a manual release lever or a motorized drive assembly, is operable by an occupant of the seat 12 to adjust the fore and aft position of the seat 12 on the track assembly 32 and to retain the seat 12 releasably in a position selected by the occupant. Such a positioning apparatus may comprise any suitable structure known in the art.

As shown partially in FIGS. 2 and 3, one of the lower tracks 44 has a slot 50 extending along its length. The length of the slot 50 is at least as great as the range of movement through which the upper track 42 is movable longitudinally relative to the lower track 44. The width of the slot 50 is defined by and between a pair of opposed, parallel inner edge surfaces 52 of the lower track 44.

The blocking device 36 is supported on the upper track 42 directly above the slot 50. Specifically, the blocking device 36 includes a cylinder 54 and a cylindrical locking pin 56. A weld 58 mounts the cylinder 54 on an upper side surface 60 of the upper track 42. The locking pin 56 projects from an open lower end 62 of the cylinder 54 through a circular aperture 64 in the upper track 42, and has a tapered outer end portion 66 centered over the slot 50.

The blocking device 36 further includes an electrically actuatable initiator 70. The initiator 70 is received in the cylinder 54 between the locking pin 56 and an upper end wall 72 of the cylinder 54. A small charge of pyrotechnic material (not shown) is contained in the initiator 70. A pair of electrical leads 76 project from the initiator 70 through the upper end wall 72 of the cylinder 54. The pyrotechnic material is ignited in a known manner upon the passage of electric current through the initiator 70 between the leads 76.

When the pyrotechnic material in the initiator 70 is ignited, it rapidly produces gases that develop a thrust against the locking pin 56. The locking pin 56 is then propelled further outward of the cylinder 54 and through the aperture 64 in the upper track 42. The tapered outer end portion 66 of the locking pin 56 is thus propelled into and through the slot 52 in the lower track 44.

As shown in FIG. 3, the tapered outer end portion 66 of the locking pin 56 has an outer diameter slightly greater than the width of the slot 50. Therefore, when the tapered outer end portion 66 is propelled into and through the slot 50, it is forced into an interference fit with the lower track 44. The interference fit is established upon deformation of the metal material of the lower track 44 adjacent to the edge surfaces 52 when the locking pin 56 moves forcefully against and past the edge surfaces 52. An interference fit is thus established between the upper and lower tracks 42 and 44 so that the upper track 42 is blocked from moving longitudinally relative to the lower track 44.

The apparatus 10 (FIG. 1) further includes a seat belt system 80 for restraining an occupant of the seat 12. The seat belt system 80 includes seat belt webbing 82 and a seat belt buckle 84. The webbing 82 extends upward from a seat belt retractor 86 to a D-ring 88, through the D-ring 88, and downward from the D-ring 88 to an anchor 90. A locking tongue 92 on the webbing 82 is releasably lockable in the buckle 84 when the webbing 82 has been extracted from the retractor 86 and extended around an occupant of the seat 12.

A pretensioner 94 (shown schematically) is operatively associated with the retractor 86. The pretensioner 94 is a known device that is actuatable to impart tension to the webbing 82 suddenly upon the occurrence of a vehicle crash. The tension imparted by the pretensioner 94 helps the webbing 82 restrain an occupant of the seat 12.

As shown in FIG. 4, the blocking device 36 and the pretensioner 94 are operatively associated with a controller 96 and a sensor 98. The sensor 98 is a known device that senses vehicle conditions indicating the occurrence of crash. Such conditions include sudden vehicle acceleration that indicates the occurrence of a rear impact crash. The controller 96, which may comprise any suitable microprocessor known in the art, responds to the sensor 98 by controlling actuation of the blocking device 36 and the pretensioner 94 with reference to the crash-indicating acceleration sensed by the sensor 98.

The sensor 98 may sense crash-indicating acceleration within a specified range of relatively low levels. Such a low level of crash-indicating acceleration indicates the occurrence of a crash having a corresponding low level of severity. The sensor 98 may alternatively sense crash-indicating acceleration that meets a specified threshold level. The threshold level of crash-indicating acceleration indicates the occurrence of a crash having a corresponding threshold level of severity for which actuation of the pretensioner 94 is desired to help restrain an occupant of the seat 12. Therefore, if the sensor 98 senses crash-indicating acceleration that is not less than the threshold level, the controller 96 will respond by providing an electrical actuation signal that actuates the pretensioner 94.

In accordance with a particular feature of the present invention, the threshold level of crash-indicating acceleration is the lowest in a specified range of intermediate acceleration levels. Each intermediate acceleration level indicates the occurrence of a crash having a corresponding intermediate level of severity. The controller 96 will not provide an actuation signal for actuation of the initiator 70 in the blocking device 36 if the crash-indicating acceleration sensed by the sensor 98 is below or within the specified range of intermediate levels. This permits aft movement of the seat 12 under the influence of intermediate crash forces if such crash forces are great enough to overcome the retaining force of the positioning apparatus 48 (FIG. 1). Forces then act through a distance such that work is performed and energy is dissipated. More specifically, kinetic energy of a seated occupant is dissipated to help protect the occupant from injury.

The vehicle may experience acceleration above the upper limit of the specified range of intermediate levels. Such acceleration indicates the occurrence of a crash having a relatively high level of severity. If the sensor 98 senses such a high level of crash-indicating acceleration, the controller 96 will respond by providing the initiator 70 in the blocking device 36 with an electrical actuation signal in the form electric current that is directed between the leads 76 (FIG. 2). The actuated blocking device 36 can then block aft movement of the seat 12 under the influence of crash forces resulting from the high severity crash.

A second embodiment of the present invention is shown partially in FIG. 5. In the second embodiment, the seat 12 in the apparatus 10 (FIG. 1) is equipped with an additional blocking device 100.

The blocking device 100 includes an elongated cylinder 102 and a relatively short anchor cup 104, each of which is centered on a common longitudinal axis 105. An upper weld 106 fixes the cylinder 102 to the upper section 20 of the seat frame 18. A lower weld 108 fixes the anchor cup 104 to the lower section 22 of the frame 18. An open upper end 110 of the anchor cup 104 is spaced axially from an open lower end 112 of the cylinder 102.

The blocking device 100 further includes an elongated locking bar 120. The locking bar 120 is received in the cylinder 102, and is movable outward through the open lower end 112 of the cylinder 102. An electrically actuatable initiator 122 is received in the cylinder 102 between the locking bar 120 and an upper end wall 124 of the cylinder 102. Like the initiator 70 described above, the initiator 122 contains a small charge of pyrotechnic material which is ignited in a known manner upon the passage of electric current through the initiator 122 between a pair of electrical leads 128.

In the second embodiment of the invention, the controller 96 (FIG. 4) is responsive to the sensor 98 so as to provide the initiator 122 in the blocking device 100 with an electrical actuation signal in the same manner as described above regarding the initiator 70 in the blocking device 36. The pyrotechnic material in the initiator 122 is thus ignited upon the occurrence of relatively high level of crash-indicating acceleration that indicates the occurrence of a vehicle crash having a corresponding high level of severity.

When the pyrotechnic material in the initiator 122 is ignited, it produces gases that develop a thrust against the locking bar 120 to propel the locking bar 120 axially outward of the cylinder 102 and into the anchor cup 104. The locking bar 120 then extends between and within both the cylinder 102 and the anchor cup 104, and is thus interposed as a stiffener between the upper and lower sections 20 and 22 of the frame 18. The blocking device 100 can then block pivotal movement of the seat back 24 relative to the seat bottom 28 under the influence of crash forces applied to the seat back 24 by an occupant of the seat 12.

As described above, the first and second embodiments of the present invention include the controller 96 for actuation of the pretensioner 94 and the initiators 70 and 122. In a third embodiment, any one or more of those electrically actuatable devices is arranged in an electrical actuation circuit 130 in the manner shown schematically in FIG. 6. The circuit 130 of FIG. 6 includes an electrically actuatable device 132, a sensor 134, and a power source 136. The power source 136 preferably comprises the vehicle battery and/or a capacitor. The sensor 134 is a known device that includes a normally open switch 138. The switch 138 closes when the sensor 134 senses vehicle acceleration of a specified high level which is predetermined to be above the range of intermediate levels described above. The sensor 134 thus responds to the high level of crash-indicating acceleration by providing an electrical actuation signal in the form of current which is directed through the device 132 to actuate the device 132.

A fourth embodiment of the present invention is shown partially in FIG. 7. In the fourth embodiment, the seat 12 in the apparatus 10 (FIG. 1) includes an alternative blocking device 140 in place of the blocking device 36. Like the blocking device 36, the blocking device 140 is actuatable to block aft movement of the seat 12 on the track structure 32 under the influence of vehicle crash forces applied to the seat back 24 by an occupant of the seat 12.

The blocking device 140 includes upper and lower sawtooth structures 142 and 144. A weld 146 fixes the lower saw-tooth structure 144 to a lower track 44 in the track structure 32. A hub 148 at one end of the upper saw-tooth structure 142 is received on a shaft 150 which is fixed to the adjacent upper track 42. The hub 148 supports a pivotal inertia weight 152. More specifically, the hub 148 interconnects the upper saw-tooth structure 142 and the inertia weight 152 for simultaneous movement pivotally about the axis 153 of the shaft 150.

When the vehicle experiences a rear impact crash, forward vehicle acceleration will cause the inertia weight 152 to move pivotally about the axis 153 in a counterclockwise direction, as viewed in FIG. 7. The upper saw-tooth structure 142 will simultaneously move pivotally about the axis 153 toward the lower saw-tooth structure 144. If the inertia weight 152 is thus moved fully to an actuated position, the upper saw-tooth structure 142 will be moved into engagement with the lower saw-tooth structure 144 and will block aft movement of the upper track 42 upon meshing with the lower saw-tooth structure 144.

The inertia weight 152 is movable fully to the actuated position under the influence of vehicle acceleration above the specified range of intermediate levels. The inertia weight 152 is movable only partially to the actuated position under the influence of vehicle acceleration below or within the specified range of intermediate levels. Accordingly, like the blocking device 36 in the first embodiment of the invention, the blocking device 140 in the fourth embodiment permits aft movement of the seat 12 under the influence of intermediate crash forces if such forces are great enough to overcome the resistance of the positioning apparatus 48 (FIG. 1).

As shown schematically in FIG. 8, a fifth embodiment of the present invention includes an alternative initiator 160. The initiator 160 may be used in place of the initiator 70 in the first embodiment and/or the initiator 122 in the second embodiment. Like those initiators 70 and 122, the initiator 160 includes a small charge of pyrotechnic material. However, the initiator 160 includes a percussion primer 164 rather than a pair of electrical leads for igniting the pyrotechnic material 162. The percussion primer 164 is actuatable upon the application of force to the percussion primer 164. When the percussion primer 164 is actuated, it ignites the pyrotechnic material 162.

The fifth embodiment further includes an inertia weight 170 and a release member 172. The inertia weight 170 and the release member 172 are normally located in the positions of FIG. 8. The release member 172 then holds a firing pin 174 at a location spaced from the percussion primer 164 against the bias of a spring 176.

The inertia weight 170 and the release member 172 are movable together pivotally about an axis 177 under the influence of crash-indicating acceleration, as indicated by the arrows shown in FIG. 8. If the crash-indicating acceleration is above the specified range of intermediate levels, the inertia weight 170 and the release member 172 will pivot fully to actuated positions so as to release the firing pin 174 to impact the percussion primer 164 under the influence of the spring 176. The initiator 160 is thus actuated under the influence of vehicle acceleration above the specified range of intermediate levels.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
    means for sensing and responding to crash-indicating vehicle acceleration by providing an electrical actuation signal; and
    a blocking device responsive to said electrical actuation signal to block at least a portion of a vehicle seat frame from moving under the influence of vehicle crash forces upon the occurrence of said crash-indicating acceleration, the blocking of said portion of said vehicle seat occurring due to said electrical actuation signal;
    said sensing and responding means being operative so as not to provide said electrical actuation signal if said crash-indicating acceleration is within a predetermined range of levels that indicate crashes having corresponding predetermined levels of severity, and to provide said electrical actuation signal if said crash-indicating acceleration has a relatively high level above said predetermined range of levels.

2. The apparatus as defined in claim 1 wherein said blocking device comprises a locking member and a charge of pyrotechnic material which, when ignited, develops a thrust which propels said locking member to a position in which said blocking device can block the portion of said seat frame from moving under the influence of said vehicle crash forces.

3. The apparatus as defined in claim 1 wherein said blocking device is actuatable to block aft movement of the seat frame on a track structure.

4. The apparatus as defined in claim 1 wherein said blocking device is actuatable to block pivotal movement of a back portion of the seat frame relative to a bottom portion of the seat frame.

5. The apparatus as defined in claim 1 wherein said sensing and responding means includes a sensor which is operative to sense said crash-indicating acceleration and an electronic controller which is responsive to said sensor so as to provide s aid electrical actuation signal with reference to said crash-indicating acceleration.

6. An apparatus comprising:
  an inertia weight which is movable toward an actuating position under the influence of crash-indicating vehicle acceleration, said inertia weight being movable only partially to said actuating position under the influence of crash-indicating acceleration associated with a predetermined range of levels that indicate crashes having corresponding predetermined levels of severity, and being further movable fully to said actuating position under the influence of crash-indicating acceleration above said predetermined range of levels; and
  a blocking device responsive to movement of said inertia weight fully to said actuating position so as to block at least a portion of a vehicle seat frame from moving under the influence of vehicle crash forces upon the occurrence of crash-indicating acceleration above said predetermined range of levels;
  said blocking device comprising a locking member and a charge of pyrotechnic material which, when ignited, develops a thrust which propels said locking member to a position in which said blocking device can block said portion of said frame from moving under the influence of said vehicle crash forces.

7. The apparatus as defined in claim 6 wherein said blocking device is configured to block aft movement of the seat frame on a track structure.

8. The apparatus as defined in claim 6 wherein said blocking device is configured to block pivotal movement of back portion of the seat frame relative to a bottom portion of the seat frame.

9. The apparatus as defined in claim 6 wherein the influence of crash-indicating acceleration below the predetermined range of level would indicate crashes to have corresponding said predetermined levels of severity.

10. The apparatus as defined in claim 6 wherein the influence of crash-indicating acceleration within the predetermined range of levels would indicate crashes to have corresponding said predetermined levels of severity.

11. An apparatus comprising:
  means for sensing and responding to crash-indicating vehicle acceleration by providing an electrical actuation signal; and
  a blocking device responsive to said electrical actuation signal to block at least a portion of a vehicle seat frame from moving under the influence of vehicle crash forces upon the occurrence of said crash-indicating acceleration, the blocking of said portion of said vehicle seat occurring due to said electrical actuation signal;
  said sensing and responding means being operative so as not to provide said electrical actuation signal if said crash-indicating acceleration is below a predetermined range of levels that indicate crashes having corresponding predetermined levels of severity, and to provide said electrical actuation signal if said crash-indicating acceleration has a relatively high level above said predetermined range of levels.

* * * * *